March 25, 1952  L. J. KOCI  2,590,328
HEATING UNIT FOR COOKING DEVICES
Original Filed Jan. 30, 1948  2 SHEETS—SHEET 1
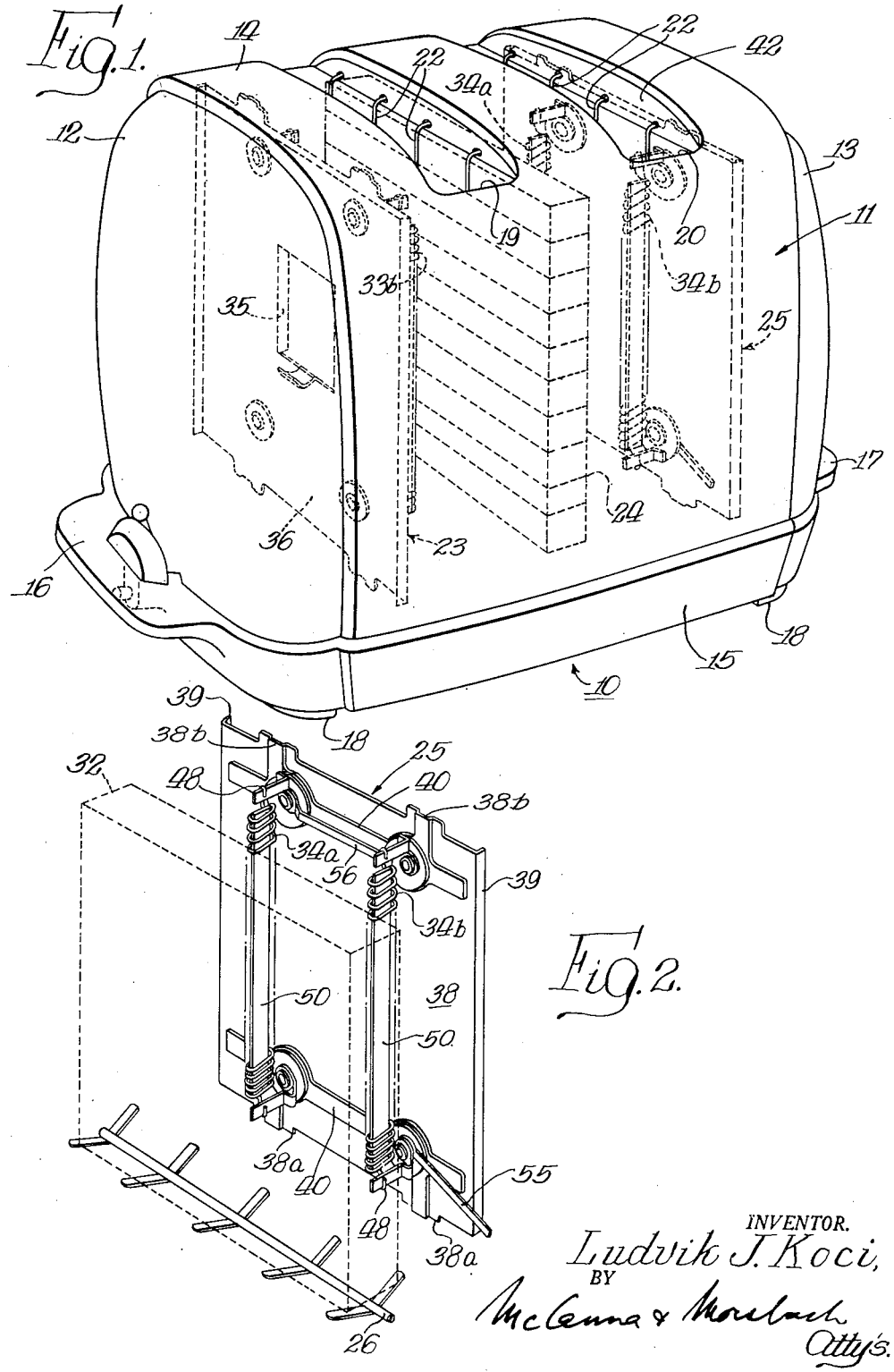
INVENTOR.
Ludvik J. Koci,
BY
McKenna & Morlach
Attys.

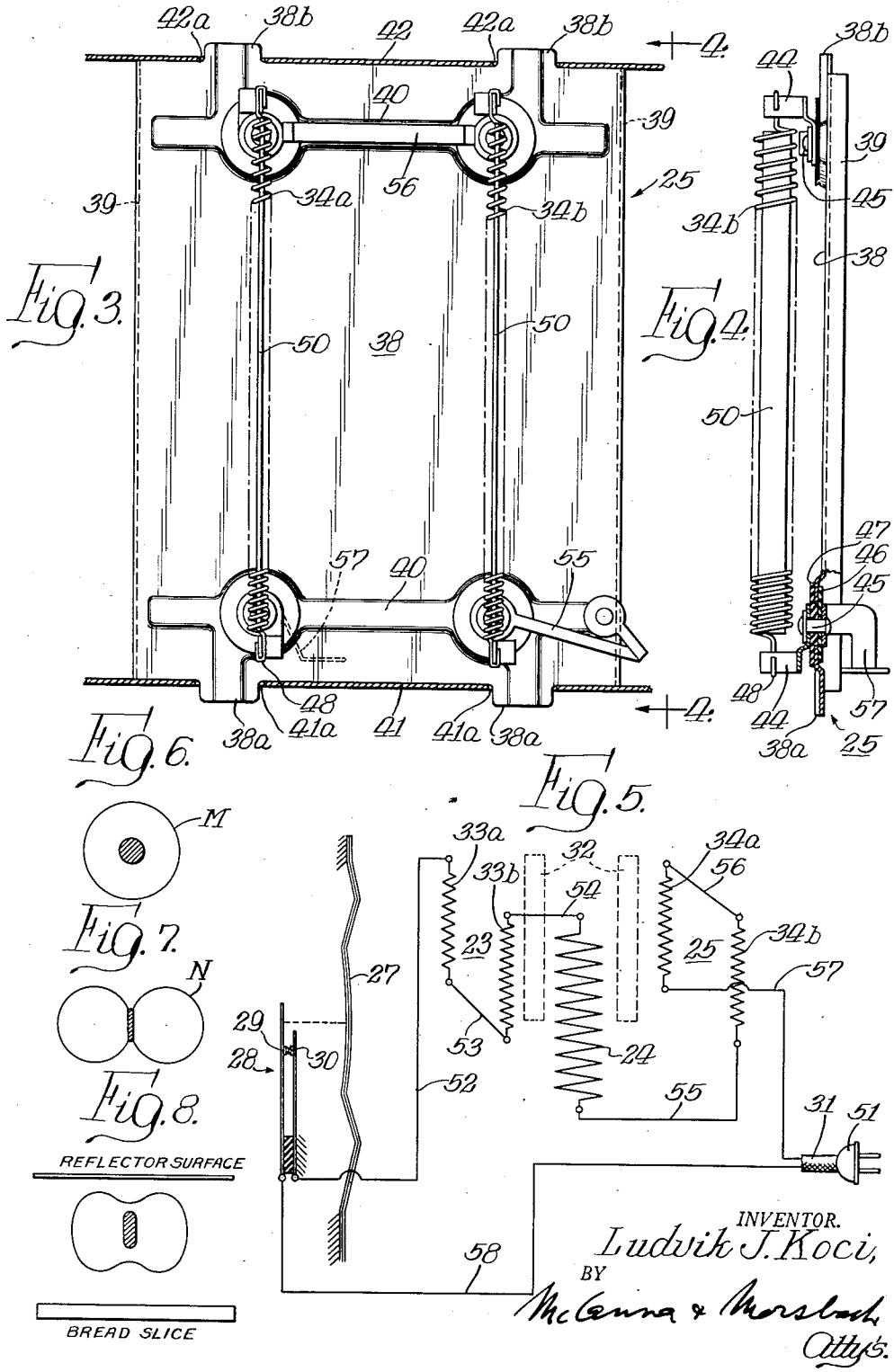

Patented Mar. 25, 1952

2,590,328

UNITED STATES PATENT OFFICE 2,590,328

HEATING UNIT FOR COOKING DEVICES

Ludvik J. Koci, Chicago, Ill., assignor to Sunbeam Corporation, Chicago, Ill., a corporation of Illinois Original application January 30, 1948, Serial No. 5,247. Divided and this application February 26, 1948, Serial No. 11,102

10 Claims. (Cl. 219—19)

The present invention relates to a heating unit for a cooking device and more particularly to a heating unit for a toaster. Specifically the present invention is a division of co-pending application, Serial No. 5,247, filed January 30, 1948.

It has been discovered that the only accurate index which may be relied upon to determine the degree of toasting of a bread slice surface is the temperature of that surface. In a co-pending Koci application Serial No. 639,934, filed January 9, 1946, now Patent No. 2,459,169, there is disclosed and claimed a radiation thermostat control for an automatic toaster in which a bimetallic element is employed which is responsive only to the heat radiated from a large area of the bread surface being toasted. It will be understood that such radiation from the bread slice surface is very insignificant compared to the direct radiation from the heating units themselves. Consequently, in a control device which is intended to respond to the surface temperature of a large area of the bread slice being toasted, it is apparent that all direct radiation from the heating units must be prevented from reaching such a control device. Conventional heating elements or units which have heretofore been employed in automatic toasters do not lend themselves readily to such an arrangement since they are usually disposed on a support having an area of the order of the bread slice with the portions of the heating unit distributed over this area. It would be desirable to provide heating units which are particularly useful in automatic toasters employing the above mentioned type of control wherein a substantial space is provided between adjacent portions of the heating unit near the center of the bread slice, so as to afford an unimpeded path between the bread slice and the control element for the passage of radiation from the surface of said bread slice, while still permitting ready shielding of the heating elements or units to prevent direct radiation therefrom from reaching the control device.

It will be understood that in any case the heating units must provide uniform heating over a substantial area so that when employed in an automatic toaster all portions of the bread slice will be uniformly toasted and this should be the case regardless of the age or extent of use of the toaster. This could be accomplished without too much difficulty in conventional heating units where the heating element was distributed substantially over the entire area of the material which was being heated. However, where a substantial open space is desired between adjacent portions of the heating unit near the center of the bread slice, which space must be devoid of any portion of the heating element, a different problem is presented. By employing specially shaped reflectors it is possible to design a heating unit which as initially designed might operate satisfactorily, but with age and use would become entirely unsatisfactory.

Accordingly it is an object of the present invention to provide a new and improved heating unit for a cooking device.

It is another object of the present invention to provide an improved heating unit for an automatic toaster which insures uniform heating over the entire surface of the bread slice even in the absence of any reflectors, while concentrating the heating elements in a fairly confined space so as to provide a large open space between adjacent portions of the heating unit.

It is a further object of the present invention to provide a new and improved heating unit comprising a pair of spaced linear heating elements which are so constructed and arranged as to provide uniform heating over a substantial plane surface area, even in the absence of any special reflectors or the like, and in fact even in the absence of any reflector.

Still another object of the present invention resides in the provision of a pair of spaced linear heat sources of non-linear cross section.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is a perspective view of a cooking device in the form of an automatic toaster embodying the present invention;

Fig. 2 is a perspective view of the heating unit of the present invention shown in relation to a bread slice disposed on the movable bread rack conventionally employed in automatic toasters with the bread rack moved to its toasting or cooking position;

Fig. 3 is a front elevational view of the heating element shown in Fig. 2 embodying the present invention;

Fig. 4 is a side view of the heating element of Fig. 3 looking in the direction of the arrows 4—4 in Fig. 3;

Fig. 5 is a schematic circuit diagram of the electrical circuit and control arrangement of the automatic toaster with which the present invention is employed; and Figs. 6, 7 and 8 are heat radiation patterns to aid in understanding the operation of the heating elements of the present invention.

Referring now to the drawings, the automatic toaster generally designated by the reference numeral 10 in Fig. 1 comprises an outer casing generally designated at 11 comprised of a pair of end shells 12 and 13 and a U-shaped central shell member 14 cooperating with the end shells 12 and 13 to provide an outer casing or housing for the toaster. A suitable base 15 is also provided, preferably formed of a suitable molded insulating material which base includes integrally formed handle portions 16 and 17 at either end thereof and suitable feet 18 at the bottom thereof. Since the present invention is primarily concerned with a new and improved heating unit for a cooking device, the particular construction of the other parts of the automatic toaster, which have been illustrated to show a specific application of the present invention, are immaterial as far as the present invention is concerned. The novel features of such automatic toaster are fully disclosed and claimed in the parent application referred to above from which the present application has been divided. A brief description of a few essential parts of the cooking device embodying the heating units or elements of the present invention is included to provide a better understanding of a particular application of the present invention where it is especially effective.

The shell or outer casing 11 of the automatic toaster 10 includes spaced parallel slots 19 and 20 at the top thereof for the insertion of slices of bread, and effectively the slots 19 and 20 define entrances to the toasting chambers of the automatic toaster 10. These toasting chambers (not clearly shown in the drawings) are defined between a plurality of vertically disposed guide wires 22, the upper ends of which are visible through the parallel slots 19 and 20. These guide wires effectively define the toasting chambers which are disposed between a plurality of spaced heating units designated at 23, 24 and 25 in Fig. 1 of the drawings without substantially interfering with radiation between such heating units and the bread slices disposed within the toasting chamber for toasting purposes. It will be apparent that the toasting chamber associated with the slot 19 is disposed between the heating units 23 and 24 whereby both sides of the bread slice disposed in such toasting chamber may be simultaneously toasted. Similarly the toasting chamber associated with the slot 20 is disposed between the heating units 24 and 25. The heating unit 24, therefore, is effective simultaneously to heat adjacent sides of bread slices disposed in both toasting chambers. Although a conventional two-slice toaster has been illustrated it will be apparent that it might equally well comprise a single slice toaster or a toaster for more than two slices.

For the purpose of moving the bread slices to and from the toasting position a movable bread rack is disposed in each toasting chamber. The bread rack disposed in the toasting chamber associated with the slot 20 is shown in Fig. 2 of the drawings and designated by the reference numeral 26. The bread rack 26 is shown in its lowermost or toasting position.

For the purpose of readily distinguishing between the specific heating units 23, 24 and 25, the heating unit 24 is designated as the center heating unit since it is disposed centrally between the two toasting chambers. The elements 23 and 25 are designated as end heating elements since they are disposed adjacent the ends of the toaster. To further designate these end heating units, the end heating unit 23 is specifically designated as the thermostat end heating unit, while the unit 25 is designated as the cord end heating unit. These designations are applied to the heating units solely in the interest of more clearly understanding the present invention and no other significance should be attached to such specific designations thereof.

In the circuit diagram of Fig. 5 of the drawings, the end heating units 23 and 25 and the center heating unit 24 are schematically illustrated, and the reason for the specific designation applied to these heating units becomes apparent since the thermostat end heating unit 23 is disposed adjacent a control device in the form of a thermostat generally designated at 27, which thermostat is adapted to control a suitable switch 28 comprising relatively movable contacts 29 and 30. On the other hand the cord end heating unit 25 is illustrated as being adjacent a suitable power cord 31 which may comprise a conventional appliance cord for connecting the automatic toaster to a source of electrical energy such as a conventional wall outlet or the like. A pair of bread slices 32 shown in phantom in Fig. 5 are schematically illustrated as being disposed within the toasting chambers (not shown) between the heating elements 23 and 24 and 24 and 25 respectively. A bread slice 32, shown in phantom, is disposed on the bread rack 26 shown in Fig. 2 of the drawings. The center heating unit 24 is illustrated as being constructed in the more conventional manner but it will be understood that it may comprise any form of heating unit or element and in fact may comprise the heating unit of the present invention. As is disclosed and claimed in a copending Loomer application, Serial No. 11,646, filed February 27, 1948, assigned to the same assignee as the present application, the center heating element 24 may serve the dual function of being both a heating element and also a thermomotive device for moving the bread racks to and from the toasting position.

Before describing the toasting or heating units of the present invention attention is directed to the fact that the heating units of the present invention are preferably employed in an automatic toaster which utilizes the radiation control principle disclosed and claimed in co-pending Koci application, Serial No. 639,934 referred to above, wherein it is necessary to collect a large amount of radiation emitted from a substantial area of the bread surface being toasted and apply the same to a thermostat, bimetallic element, or other suitable control device, without permitting such bimetallic element or thermostat to receive any heat energy radiated from the heating units. The total radiant energy emitted from the bread surface by virtue of its temperature rise is relatively small and the radiant power is measured in milliwatts. Consequently it has been found that for reliable operation on the radiation control principle it is necessary to collect and direct as large an amount of the radiation emitted from the bread surface as possible, and supply the same to the bimetallic element or similar control device. It is for this reason that conventional toasting or heating units cannot be employed since it would be difficult to provide an arrangement whereby direct radiation therefrom is not received by the bimetallic element or other control device and still wherein the heat energy radiated from a large surface area of the bread surface being toasted is supplied to the bimetallic element or control device.

The heating units of the present invention provide uniform toasting over the entire bread surface while still providing a substantial area adjacent the bread slice through which a large amount of radiation from a substantial area of the bread surface being toasted may reach the thermal control device or other thermostat device at the thermostat end of the toaster without permitting direct radiation from the adjacent thermostat end toasting unit or element to also affect the thermal control device. It will be apparent that only the thermostat end heating unit 23 would need to involve the special construction of the present invention. However, the heating units of the present invention have been found to be so satisfactory, and since they are capable of being universally employed as heating elements where uniform heating over a substantial area is desired both of the end heating units 23 and 25 have been illustrated as of the type embodying the present invention.

In accordance with the present invention the end heating units each include a pair of linear heat sources comprising spaced apart vertically disposed resistor elements separated from each other by a substantial distance. As illustrated the two heating elements of each end heating unit are identical and for reasons described in greater detail hereinafter comprise a ribbon resistor wound in the form of an elliptical spiral about a core of strip insulating material with the narrow diameter of the elliptical spiral being disposed parallel to the bread slices 32 and consequently the toasting chambers defined by the guide wires 22. The heating elements of the thermostat end heating unit are designated as 33a and 33b while the heating elements of the cord end heating unit are designated as 34a and 34b. These heating elements are shown schematically in Fig. 5 of the drawings and by dotted lines in Fig. 1 of the drawings.

To simplify the description and disclosures, only the cord end heating unit 25 is described in detail, the other end heating unit 23 being identical except for the provision of a suitable window 35 between the linear heat sources defined in the associated reflector 36 to permit radiation from the bread slice surface to reach the thermostat 27. This is fully disclosed in the parent application from which this application has been divided.

For the purpose of supporting the heating elements 33a, 33b, 34a and 34b of the end heating units, each end heating unit is in the form of a unitary assembly comprising in addition to the heating elements suitable supporting and reflecting devices. The cord end heating unit 25, which is the only end heating unit described in detail in this application, comprises in addition to the heating elements 34a and 34b a combined reflector and support 38 whose effective reflector surface is a plane surface. Preferably the reflector 38 is formed of bright rolled aluminum or the like and is provided with a pair of spaced integral downwardly extending projections 38a at the lower edge thereof and similar integral upwardly extending projections 38b, at the upper edge thereof. In order to provide sufficient strength the reflector 38 is preferably provided with vertically extending flanges 39 at the edges thereof and horizontally extending ribs 40 adjacent the upper and lower horizontal edges thereof which ribs preferably include extensions into the projections 38a and 38b as is clearly shown in the drawings.

To support the reflector 38 at the cord end of the automatic toaster 10 parallel to the toasting chamber within which a bread slice 32 is adapted to be disposed the projections 38a preferably extend into suitable openings 41a defined in a bottom frame portion 41 of the toaster 10, a fragment of which is shown in Fig. 3 of the drawings. Similarly the projections 38b extend through suitable openings 42a in a top frame plate 42, a fragment of which is shown in Fig. 3 of the drawings and which is also visible in Fig. 1 of the drawings. With this arrangement it will be apparent that if the heating elements 34a and 34b are suitably supported from the reflector 38 that the heating unit 25 is firmly supported by the toaster frame adjacent the toasting chamber and consequently adjacent the associated bread slice 32 disposed in such toasting chamber. Although the heating elements 34a and 34b and similarly the heating elements 33a and 33b are illustrated as being vertically disposed, they could equally well be disposed in horizontal planes and still provide the desired space therebetween. The vertical disposition of the heating elements is believed to be preferable in that they are less likely to provide a ledge for catching crumbs and also they readily permit variation in spacing between adjacent turns to provide for convection heat transfer which is always present when the elements are spaced from the material to be heated. For this reason the vertical arrangement is disclosed in the drawings and furthermore the heating elements 33a, 33b, 34a and 34b have the lowermost turns thereof spaced more closely together than the upper turns as is clearly shown in Figs. 2, 3 and 4 of the drawings.

In order to support the heating element 34a a pair of brackets 44 are provided spaced vertically from each other and suitably riveted to the reflector 38 by means of rivets 45. Since the brackets 44 are preferably employed both as a mechanical support for the heating element associated therewith as well as electrical connections for the terminals thereof, suitable insulating washers and bushing arrangements 46 and 47 are provided as is clearly shown in Fig. 4 of the drawings. Identical brackets 44 and fastening means therefor are provided for the heating element 34b. The ends of the heating elements 34a and 34b are preferably bent into the form of hooks 48 which are hooked over the brackets 44 as is clearly shown in Fig. 2 of the drawings. These hooks 48 are preferably spot welded to the brackets 44 to insure proper mechanical support as well as satisfactory electrical connection thereto.

In order that the reflector 38 is effective uniformly to reflect heat energy radiated from the entire vertical extent of the heating elements 34a and 34b, it is desirable that the heating elements are uniformly spaced from the reflector. To insure such uniform spacing there is preferably disposed within the turns of the heating elements 34a and 34b a suitable core in the form of a strip of insulating material 50 with the narrow dimension of the strip being directed toward the reflector 38. This strip will prevent bending of the heating elements in a direction toward and away from the reflector 38. Bending of the elements 34a and 34b in the other direction will not adversely affect the heating thereof in the same manner as bending in the direction prevented by the strips 50. These elements 34a and 34b may be initially wound on these strips 50 to present a spiral winding of elliptical or non-circular cross section.

It will be understood that any suitable means of supplying electrical energy to the heating elements 24, 33a, 33b, 34a and 34b may be provided. These individual heating elements may be connected in parallel, in series or in some sort of series-parallel combination. The particular manner of supplying them with electrical energy may best be understood by reference to Fig. 5 of the drawings where the heating elements are illustrated as all being connected in series with one another and to a suitable source of power through the conventional appliance cord 31 which includes the well-known plug connector 51 for connection to any suitable electrical outlet. As illustrated in Fig. 5 of the drawings the electrical circuit comprises in addition to the heating elements the control switch 28 comprising the relatively movable contacts 29 and 30. When the contacts of the control switch 28 are in the open position the circuit through the serially arranged heating elements is interrupted. Conversely, when the switch 28 is closed the circuit through the serially arranged heating elements is closed and if the plug connector 51 is connected to a suitable source of energy, current will flow through the heating elements in a well understood manner.

For the purpose of serially interconnecting the various heating elements, suitable bus bars are provided which are preferably disposed in the automatic toaster so as to be suitably spaced from any adjacent conducting portions for satisfactory insulation therefrom and furthermore so as not to interfere with any of the moving parts of the toaster as well as to be free of the toasting chambers and the like. These bus bars are schematically indicated in Fig. 5 of the drawings. To this end the upper end of the toasting element 33a is connected by means of a suitable bus bar 52 with one terminal of the switch 28. The lower ends of the heating elements 33a and 33b are interconnected by means of a bus bar 53. To interconnect the upper end of the heating element 33b and the upper end of the center heating unit 24 there is provided a suitable bus bar 54.

The lower end of the center heating unit 24 is illustrated as being electrically interconnected by means of a bus bar 55, shown in Figs. 2, 3 and 5 of the drawings, with the lower end of the heating element 34b. A suitable bus bar 56 interconnects the upper ends of the heating elements 34a and 34b. The lower end of the heating element 34a is connected by means of a lead bus bar 57 with a suitable terminal stud not shown which in turn is suitably connected to one lead of the power cord 31. The other lead of the power cord 31 is connected by means of a conductor 58 with the other terminal of the switch 28 thus completing the electrical circuit through the heating units.

As was mentioned above the thermostat end heating unit 23 having two linear heat sources associated therewith very satisfactorily provides the necessary area therebetween for the rectangular opening 35 in the reflector 36 through which heat energy radiated from a substantial area of the surface of the bread slice disposed in the adjacent toasting chamber may reach the thermostat 27. However, in order to understand why the specially shaped linear heat sources are of elliptical cross section it might be pointed out that linear heat sources of circular cross section have been employed heretofore, and in this regard attention is directed to Jepson Patent 2,368,026 assigned to the same assignee as the present application. To obtain uniform toasting however, the linear heat sources employed heretofore have required the use of specially shaped reflectors which might comprise parabolic, curved or compound curved surfaces. It will be understood that in such arrangements direct radiation from the linear heat sources themselves does not perform uniform toasting and the specially shaped reflectors are relied upon to supply the additional heat energy required at those places not satisfactorily heated from the toasting elements directly. If the reflection coefficient of the specially shaped reflectors remains constant at all times then such prior art arrangements would be entirely satisfactory. However, it is a well known fact that the reflection coefficient of any reflecting surface is likely to change with both age and use. If the toaster is employed to toast raisin bread, for example, the reflectors will soon be covered with raisin particles causing a substantial change in the reflection coefficient even assuming that any such change is uniform over the entire reflecting surface which may not always be the case. When this occurs those portions of the bread slice depending for heat reflected from the specially shaped reflectors will be heated less than when the reflectors were new. Since the direct radiation from the heating elements or heat sources does not substantially change with age or use it is apparent that non-uniform toasting will eventually occur with a design which originally produced uniform toasting by employing specially shaped reflectors and linear heat sources.

The solution to this problem of producing uniform toasting regardless of the age or use of the toaster is the provision of an arrangement which provides uniform heating in the absence of any reflectors and relies upon the reflectors only to increase the efficiency of the operation. To this end plane reflectors 36 and 38 as described above are employed and specially shaped radiators or linear heat sources are employed.

It is known that if the linear source of radiation is cylindrical in cross section the intensity is uniform in all directions therefrom for the same distance from the element. If on the other hand the cross section of the heat source is a line of infinitely small thickness and finite width the radiation intensity in any direction varies as the cosine of the angle between the normal to the flat face of such an element and the line defining the direction between the heating element and the particular point where the intensity is under consideration. The radiation from a cylindrical cross section heating source is schematically indicated by the circle M in Fig. 6 of the drawings and the radiation from a source having a line cross section is represented by the figure eight diagram N shown in Fig. 7 of the drawings. It would appear from Figs. 6 and 7 that a heat source or radiator intermediate those disclosed in Figs. 6 and 7 and disposed with reference to the bread slice as indicated in Fig. 8 of the drawings should provide a reasonably uniform intensity of radiation at the bread surface. It was found experimentally that if the original circular cross section spiral heating element of linear configuration were compressed by an amount so that the long dimension of the cross section was about two and one half times the narrow dimension that very uniform toasting was obtained using two vertical elements separated from each other by about two inches and the toasting was just as uniform regardless of whether the reflectors such as 36 and 38 were employed or not.

It will be understood that a theoretical analysis of the toasting characteristics of the linear heat sources of the present invention can readily be accomplished since the intensity of radiation at any point on a surface to be treated may be expressed by the following formula:

$$J = KP \frac{\cos \alpha}{d}$$

where J is the intensity of radiation at a point on the surface under consideration along which uniform radiation is desired, K is a constant, P is the projection of the heating element as viewed from the point in question on the surface under consideration; $\alpha$ is the angle between a line normal to the surface under consideration at the point under consideration and a line interconnecting said point with the heating element, and $d$ is the distance along the line interconnecting the point on the surface under consideration and the heating element. Neglecting P for a moment, i. e., considering a source of circular cross-section as in Fig. 6, the intensity is a maximum when $\alpha$ is zero degrees and the distance $d$ is a minimum. If the heat source shown in Fig. 7 of the drawings is employed it is apparent that when $\alpha$ equals zero the intensity J is substantially zero since the projected area P is substantially zero. The maximum intensity of radiation would be at points to the right and left of a point corresponding to $\alpha$ equals zero. With the heat source shown in Fig. 8 the projection P is a variable as is also the case with the heat source of Fig. 7. However, with the heat source of Fig. 6 the projection P is constant. In calculating the particular design of heating element necessary for producing uniform heating along a surface it may be considered that each point on the bread slice surface being toasted is heated directly from the two linear sources of energy and from a plurality of image sources displaced in a predetermined manner. The image sources are of course due to reflections from various surfaces within the toaster. For the particular toaster described in detail in the parent case the reflections from the toaster frame effectively produce ten image sources. Effectively, therefore, for two linear heat sources such as 34a and 34b each point on the bread surface may be considered to be heated by two direct sources of radiation and ten image sources. The intensity of the radiant energy at any point from the ten image heat sources mentioned may be expressed by the above mentioned radiation intensity formula which in the case of reflected energy is multiplied by the particular reflection coefficient of the reflecting surface involved. Obviously the reflection coefficient of the reflecting surface 38 will be much higher than that of the frame portions of the toaster which are not especially designed for reflecting action. The experimental results conform very closely to the results obtained by the analytical method considering ten image sources and two direct sources for each heating unit. With the end toasting units of the present invention, toasting is practically just as uniform regardless of whether the reflecting plates are employed or not and reflecting plates are employed solely to increase the efficiency of the end heating units. This construction yields toast of a uniformity equal to that obtained with toasting elements of conventional design. In addition it provides a relatively large space between the two linear heat sources for the location of the large opening such as 35 to collect radiation from the bread surface being toasted to reliably operate the control element. In addition the construction is very simple and inexpensive from a manufacturing standpoint.

From the above discussion it will be apparent, with a heating element of elliptical cross section that its projection when viewed from any given point on the surface of a bread slice being toasted will approximately equal $$K_1 \frac{d}{\cos \alpha}$$

where $K_1$ is a constant, so that the intensity of radiation over the surface will be approximately uniform in conformity with the expression $$J = KP \frac{\cos \alpha}{d}$$

It will be understood that the heating units 23 and 25 readily permit of adequate shielding of the thermostat 27 so as not to be affected by direct radiation from the heating elements of the toaster. In other words with the arrangement described above it is possible to permit substantially only radiation from the bread slice surface being toasted to pass through the opening or window 35 and readily shield the thermostat 27 from any other radiation.

In view of the detailed discussion included above the operation of the new and improved heating unit of the present invention will be understood by those skilled in the art. Uniform toasting of the entire surface area of each side of the bread slice is accomplished even in the absence of reflectors such as 36 and 38 which are provided merely to increase the efficiency of the heating units.

While only a single embodiment of the present invention has been described and illustrated it should be understood that the present invention is capable of various changes and modifications. It is intended in the appended claims to cover all such changes and modifications as fall within the true spirit and scope of the present invention.

What is desired to be secured by Letters Patent of the United States is:

1. In a cooking device, a heating unit for producing uniform heating by direct radiation from said heating unit along a plane surface comprising for said entire plane surface only a pair of spaced linear heat sources in the form of electric heating elements each of elliptical cross section, said linear heat sources having their longitudinal axes disposed in a common plane parallel with said plane surface, the major axis of the elliptical cross section of each of said linear heat sources being perpendicular to said plane surface, said major axis being of the order of between two and three times greater than the minor axis of said elliptical cross section, the spacing between said heat sources being large relative to the distance between said common plane and said plane surface.

2. A heating unit for a toaster for producing uniform heating along the entire surface of one side of a bread slice disposed adjacent thereto, including solely a pair of linear heat sources comprising electro heating elements each comprising a resistance wire wound so as to present a coil of elliptical cross section, said linear heat sources having their longitudinal axes disposed in a common plane parallel with said bread slice, the major axis of the elliptical cross section of each of said linear heat sources being perpendicular to said bread slice, the longitudinal axes of said linear heat sources being vertical whereby said heat sources provide a minimum area for collecting crumbs, said linear heat sources being spaced from each other by a distance substantially greater than the major axis of the elliptical cross section.

3. A bread slice toaster comprising a pair of spaced heating units and a toasting chamber disposed therebetween for receiving a bread slice to be toasted, each of said heating units being capable of toasting the adjacent bread slice surface, one of said heating units comprising a pair of linearly extending heating elements spaced from each other, each of said elements comprising a coil of resistance wire wound to present a coil of elliptical cross section so as to provide uniform heating by direct radiation from said elements over the entire adjacent surface of a bread slice which might be disposed in said toasting chamber, the longitudinal axes of said elements being disposed in a plane parallel with said toasting chamber, and means for supporting said elements so that the major axis of each elliptical cross section is substantially perpendicular to the surface of a bread slice which might be disposed in said toasting chamber, said linearly extending heating elements being spaced from each other by a distance several times the extent of the major axis of said elliptical cross section and also by a distance relatively greater than the distance between said one heating unit and the adjacent surface of a bread slice disposed in said toasting chamber.

4. A bread slice toaster comprising a pair of spaced heating units and a toasting chamber disposed therebetween for receiving a bread slice to be toasted, each of said heating units being capable of toasting the adjacent bread slice surface, one of said heating units comprising a pair of spaced linearly extending heating elements, each of said elements comprising a strip of electrical conductor presenting substantial resistance to the flow of current therethrough arranged in the form of a spiral to present a coil of elliptical cross section, the longitudinal axes of said elements being disposed in a plane parallel with said toasting chamber, and means for supporting said elements so that the major axis of each elliptical cross section is substantially perpendicular to the surface of a bread slice which might be disposed in said toasting chamber, whereby to provide uniform heating across the entire adjacent surface of a bread slice which might be disposed in said toasting chamber by direct radiation from said elements, said linearly extending heating elements being spaced from each other by a distance which is relatively large compared to the distance between said one heating unit and the adjacent surface of a bread slice disposed in said toasting chamber.

5. In a cooking device, a heating unit for producing uniform heating over an entire plane surface having an area of the order of that of the surface of a bread slice, including solely a pair of spaced linear heat sources each comprising a thin strip of insulating material and an electrical conductor having a substantial electrical resistance so as to function as a heater element when electric current flows therethrough, said electrical conductor being wound as a flattened spiral about said strip, and means for supporting said linear heat sources with their longitudinal axes disposed in a common plane parallel with said plane surface with the flat sides of said flattened spiral perpendicular to said plane surface, said linear heat sources being spaced from each other by a distance which is relatively large compared to the distance between said heating unit and said plane surface.

6. A bread slice toaster comprising a pair of spaced heating units and a toasting chamber disposed therebetween for receiving a bread slice to be toasted, each of said heating units being capable of toasting the adjacent bread slice surface, one of said heating units comprising a pair of spaced linearly extending heating elements, said heating elements being spaced from each other by a distance relatively large compared to the distance from said one heating unit to the adjacent surface of a bread slice disposed in said toasting chamber, each of said elements comprising an electrical conductor of resistance material wound to present a spiral of elliptical cross section, the longitudinal axes of said elements being disposed in a plane parallel with said toasting chamber, means for supporting said elements so that the major axis of each of said elliptical cross sections is substantially perpendicular to the surface of a bread slice which might be disposed in said toasting chamber, so as to provide uniform heating over the entire adjacent surface of a bread slice which might be disposed in said toasting chamber by direct radiation from said elements, said last mentioned means comprising a plane reflector disposed parallel to said toasting chamber but on the side of said one heating unit remote from said toasting chamber, and means defining an opening of substantial area in said reflector whereby heat radiated from the surface of a bread slice disposed in said toasting chamber may be transmitted between said spaced heating elements and through said opening.

7. A heating unit for a toaster for producing uniform heating along the surface of a bread slice disposed adjacent thereto, including a plane reflector disposed so as to be parallel with said bread slice, a pair of linear heat sources supported from said reflector each comprising a resistance wire wound so as to present a spiral coil of elliptical cross section, said linear heat sources having their longitudinal axes disposed in a plane parallel with said reflector, said linear heat sources being disposed so as to provide uniform heating along the entire surface of said bread slice even in the absence of said reflector, means defining an opening in said reflector, said linear heat sources being spaced apart by a distance which is relatively large compared to the distance between said heating unit and said bread slice and disposed one on either side of said opening whereby direct radiation from said heat sources is prevented by said reflector from passing through said opening to reach an object disposed substantially centrally of said opening, said opening being sufficiently large to permit radiation from a large area of the surface of said bread slice to pass therethrough.

8. A heating unit for a toaster for producing uniform heating along the surface of a bread slice disposed adjacent thereto, including a plane reflector disposed so as to be parallel with said bread slice, a pair of vertically disposed linear heat sources supported from said reflector each comprising a resistance element wound so as to present a spiral coil of elliptical cross section, said linear heat sources having their longitudinal axes disposed in a plane parallel with said reflector, said linear heat sources being disposed so as to provide uniform heating along the entire surface of said bread slice even in the absence of said reflector, means defining an opening in said reflector, said linear heat sources being spaced apart by a distance which is relatively large compared to the distance between said heating unit and said bread slice and disposed one on either side of said opening, shielding means including said reflector for preventing direct radiation from said heat sources from passing through said opening to reach an object disposed substantially centrally of said opening, said opening being sufficiently large to permit radiation from a large area of the surface of said bread slice to pass therethrough for control purposes.

9. In a cooking device, a heating unit for producing uniform heating over an entire plane surface having an area of the order of that of the surface of a bread slice, including solely a pair of spaced linear heat sources each comprising a thin strip of insulating material and an electrical conductor having a substantial electrical resistance so as to function as a heater element when electric current flows therethrough, said linear heat sources being spaced from each other by a distance relatively great as compared to the distance between said heating unit and said plane surface, said electrical conductor being wound as a flattened spiral about said strip, means for supporting said linear heat sources with their longitudinal axes disposed in a vertical position and in a plane parallel with said plane surface, with the flat sides of said flattened spiral perpendicular to said plane surface, and a plane reflector disposed adjacent said heat sources and parallel with said plane surface to increase the efficiency of said heating unit.

10. A bread slice toaster comprising a pair of spaced heating units and a toasting chamber disposed therebetween for receiving a bread slice to be toasted, each of said heating units being capable of toasting the adjacent bread slice surface, one of said heating units comprising a pair of spaced vertically extending heating elements, spaced from each other by a relatively large distance as compared with the space between said one heating unit and the adjacent surface of a bread slice disposed in said toasting chamber each of said elements comprising a strip of electrical conductor presenting substantial resistance to the flow of current therethrough arranged in the form of a spiral to present a coil of elliptical cross section, the longitudinal axes of said elements being disposed in a plane parallel with said toasting chamber, and means for supporting said elements so that the major axis of each elliptical cross section is substantially perpendicular to the surface of a bread slice which might be disposed in said toasting chamber, whereby to provide uniform heating across the entire adjacent surface of a bread slice which might be disposed in said toasting chamber by direct radiation from said elements, the lowermost turns of said spiral coil being more closely spaced than said upper turns.

LUDVIK J. KOCI.

REFERENCES CITED

The following references are of record in the file of this patent:

UNITED STATES PATENTS

| Number | Name | Date |
| --- | --- | --- |
| 533,795 | Edwards | Feb. 5, 1895 |
| 1,219,650 | Lightfoot | Mar. 20, 1917 |
| 1,345,004 | Hadaway, Jr. | June 29, 1920 |
| 1,587,023 | Mottlau | June 1, 1926 |
| 1,611,769 | Mottlau | Dec. 21, 1926 |
| 1,745,340 | Parker | Jan. 28, 1930 |
| 1,955,026 | Savage | Apr. 17, 1934 |
| 2,042,215 | Edison, Jr. | May 26, 1936 |
| 2,165,204 | Anderson | July 11, 1939 |
| 2,235,091 | Vineberg | Mar. 18, 1941 |
| 2,261,496 | Happe et al. | Nov. 4, 1941 |
| 2,261,533 | Vineberg | Nov. 4, 1941 |
| 2,368,026 | Jepson | Jan. 23, 1945 |
| 2,459,169 | Koci | Jan. 18, 1949 |

FOREIGN PATENTS

| Number | Country | Date |
| --- | --- | --- |
| 445,532 | Great Britain | Apr. 14, 1936 |